(12) United States Patent
Graves

(10) Patent No.: US 9,380,761 B2
(45) Date of Patent: Jul. 5, 2016

(54) LIVESTOCK FEEDER

(75) Inventor: Travis Graves, Burlington, NC (US)

(73) Assignee: AmeriAg, LLC, Burlington, NC (US)

( * ) Notice: Subject to any disclaimer, the term of this patent is extended or adjusted under 35 U.S.C. 154(b) by 863 days.

(21) Appl. No.: 13/188,173

(22) Filed: Jul. 21, 2011

(65) Prior Publication Data

US 2012/0017838 A1 Jan. 26, 2012

Related U.S. Application Data

(60) Provisional application No. 61/366,803, filed on Jul. 22, 2010.

(51) Int. Cl.
*A01K 5/01* (2006.01)
*A01K 1/10* (2006.01)
*A01K 5/00* (2006.01)

(52) U.S. Cl.
CPC ... *A01K 5/01* (2013.01); *A01K 1/10* (2013.01); *A01K 5/00* (2013.01)

(58) Field of Classification Search
CPC .............. A01K 1/10; A01K 5/00; A01K 5/01
USPC .......... 119/51.01, 58, 60, 61.1, 61.3, 61.5, 63
See application file for complete search history.

(56) References Cited

U.S. PATENT DOCUMENTS

| | | | |
|---|---|---|---|
| 493,040 A * | 3/1893 | Morse | 119/51.5 |
| 1,545,007 A * | 7/1925 | Milliken | 248/131 |
| 2,500,889 A | 3/1950 | Winkler | |
| 2,592,638 A | 4/1952 | Andrew | |
| 2,751,883 A | 6/1956 | Bacon | |
| 2,789,532 A | 4/1957 | Hoebing | |
| 2,813,509 A * | 11/1957 | Bruno | 119/51.01 |
| 3,007,443 A * | 11/1961 | Ryan | 119/51.01 |
| 3,074,377 A | 1/1963 | Spencer | |
| 3,137,274 A | 6/1964 | Palmer | |
| 3,205,860 A | 9/1965 | Moore | |
| 3,330,257 A | 7/1967 | Warner | |
| 3,400,688 A | 9/1968 | Kolnzan | |
| D237,980 S | 12/1975 | Clugston | |
| 3,935,838 A | 2/1976 | Johnson | |
| 3,941,096 A | 3/1976 | Mann | |
| 4,029,051 A * | 6/1977 | McKinney | 119/52.4 |
| 4,303,040 A | 12/1981 | Mann | |
| 4,324,202 A | 4/1982 | Stonestreet | |
| 4,364,335 A | 12/1982 | Livingston | |
| 4,440,111 A | 4/1984 | Meyer | |
| 4,784,086 A * | 11/1988 | Hand et al. | 119/61.53 |
| 4,976,222 A * | 12/1990 | Cooke | 119/60 |
| 5,133,293 A * | 7/1992 | Boozer | 119/61.57 |

(Continued)

FOREIGN PATENT DOCUMENTS

GA 2145316 * 3/1985

*Primary Examiner* — David Parsley
(74) *Attorney, Agent, or Firm* — Jenkins, Wilson, Taylor & Hunt, P.A.

(57) ABSTRACT

Livestock feeders are provided. A livestock feeder can include a one-piece or multi-piece design. A livestock feeder can include a pan, a hood, and a base. The livestock feeder is suitable for providing feedstuffs such as nutritional supplements to a livestock animal on a free-choice basis. The livestock feeder can be durable, portable, non-corrosive and is designed to minimize spillage of feedstuffs and resist tipping over. The livestock feeder can be constructed from a molded polyethylene material.

10 Claims, 12 Drawing Sheets

(56) References Cited

U.S. PATENT DOCUMENTS

| | | | |
|---|---|---|---|
| 5,335,624 A * | 8/1994 | Baxter et al. | 119/51.5 |
| 5,394,832 A * | 3/1995 | Briley | 119/58 |
| 5,479,882 A | 1/1996 | Kerner | |
| 5,493,998 A * | 2/1996 | Warren | 119/61.54 |
| 5,626,096 A | 5/1997 | Sibley | |
| 5,630,375 A | 5/1997 | Mann | |
| 5,758,598 A * | 6/1998 | Rothert | 119/61.54 |
| D397,527 S | 8/1998 | Bruder | |
| 5,899,170 A | 5/1999 | Muckler | |
| 6,363,885 B1 * | 4/2002 | Akins | A01K 5/0135 119/51.01 |
| 6,516,747 B1 * | 2/2003 | Willinger | 119/61.54 |
| 6,550,421 B1 * | 4/2003 | Sturgis | 119/57.92 |
| 6,675,738 B1 | 1/2004 | Kemnitz | |
| 7,059,271 B2 | 6/2006 | Santa Cruz | |
| 7,267,079 B1 | 9/2007 | Larson | |
| 7,273,021 B1 * | 9/2007 | Russell | 119/57.8 |
| 7,753,000 B1 * | 7/2010 | Turner | 119/61.2 |
| 7,950,351 B2 * | 5/2011 | Mann | 119/660 |
| 2002/0179016 A1 | 12/2002 | Plymell | |
| 2007/0163512 A1 * | 7/2007 | Di Angelo et al. | 119/484 |
| 2009/0199774 A1 | 8/2009 | Hamilton | |
| 2010/0050948 A1 | 3/2010 | Lienemann | |
| 2010/0083905 A1 | 4/2010 | Robbins, III | |

\* cited by examiner

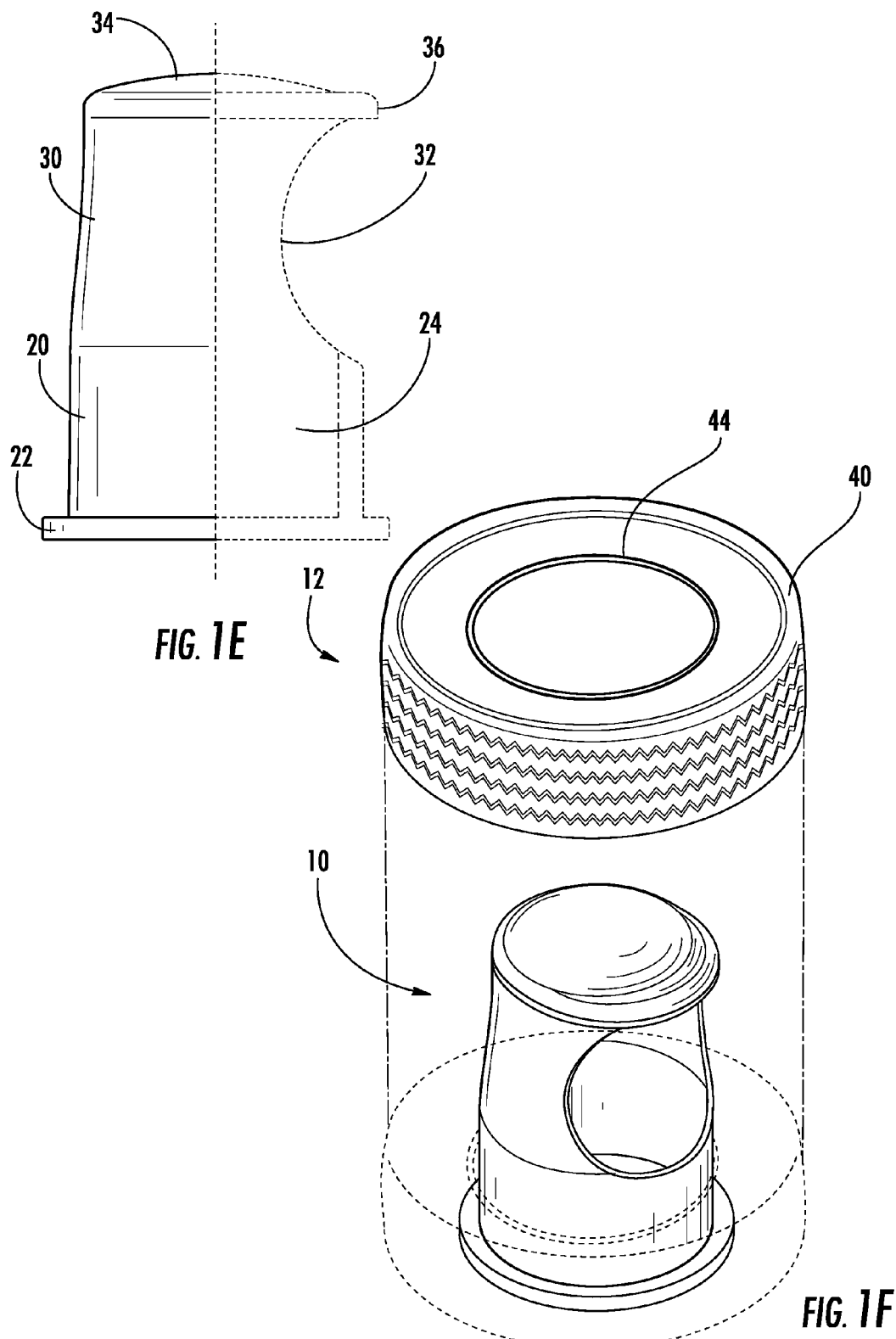

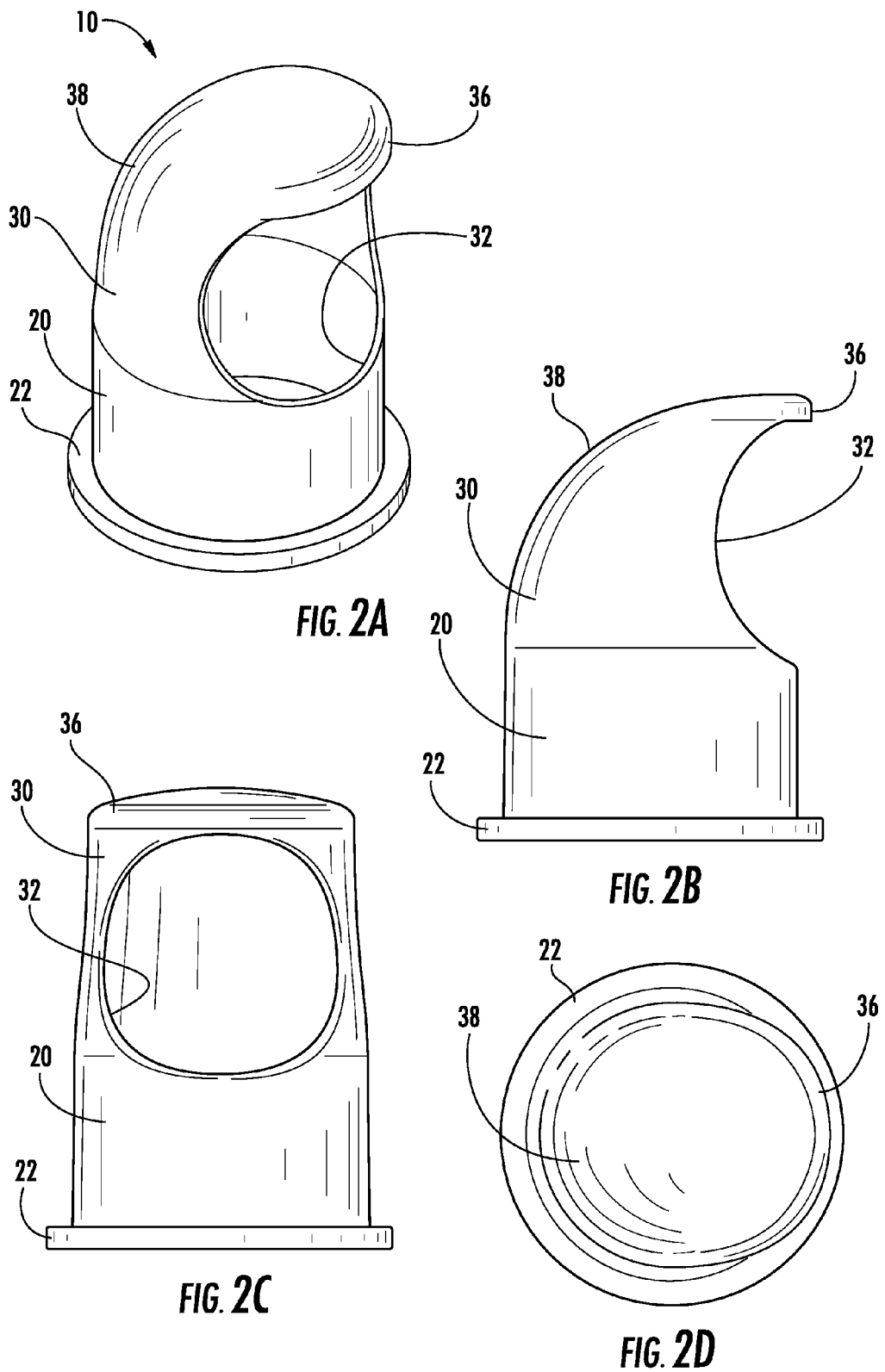

LIVESTOCK FEEDER

CROSS-REFERENCE TO RELATED APPLICATIONS

This application claims the benefit of and priority to U.S. Provisional Application No. 61/366,803 filed Jul. 22, 2010, the entire disclosure of which is herein incorporated by reference.

TECHNICAL FIELD

This presently disclosed subject matter relates to a livestock feeder. More specifically, the presently disclosed subject matter is directed to a livestock feeder suitable for providing nutritional supplements and/or feedstuffs to cattle and other livestock species. The disclosed livestock feeder is designed to be durable, portable and able to resist being tipped over by livestock.

BACKGROUND

The livestock industry utilizes supplemental feeding to meet the nutritional needs of livestock, particularly grazing livestock such as cattle, sheep, goats, horses, bison and the like. Minerals, vitamins, salts and other nutrients are often provided to livestock as a supplement to their basal diet. For example, in an effort to optimize nutritional balance, grazing cattle are often provided with trace mineral and vitamin supplements to compensate for nutrient deficiencies in the grazing animal's diet. While they can be mixed with feed, supplements of this nature are often provided to livestock on an ad libitum or free-choice basis, particularly with grazing livestock.

In order to make such supplements available to livestock on a free-choice basis the supplements are typically provided in free-standing feeders that are freely accessible to the animals. Current feeders on the market, often referred to as "mineral feeders" in the livestock industry, suffer from numerous disadvantages and weaknesses, with the primary weaknesses being durability, portability and spill prevention. As such, a need exists for a livestock feeder that is durable, portable and resists spillage, while being suitable for providing livestock with nutritional supplements.

SUMMARY

It is an object of the presently disclosed subject matter to provide novel livestock feeders.

An object of the presently disclosed subject matter having been stated hereinabove, and which is achieved in whole or in part by the presently disclosed subject matter, this and other objects will become evident as the description proceeds when taken in connection with the accompanying drawings as best described hereinbelow.

BRIEF DESCRIPTION OF THE DRAWINGS

The features and advantages of the present subject matter will be more readily understood from the following detailed description which should be read in conjunction with the accompanying drawings that are given merely by way of explanatory and non-limiting example, and in which:

FIG. 1E is a cut-away side view of a livestock feeder in accordance with the subject matter herein;

FIG. 1F is a schematic illustration of a livestock feeder in accordance with the subject matter herein, with a tire used as a base;

FIGS. 2A-2D are perspective, side, front and top views, respectively, of another embodiment of a livestock feeder of the subject matter herein;

DETAILED DESCRIPTION

Figure 1A:
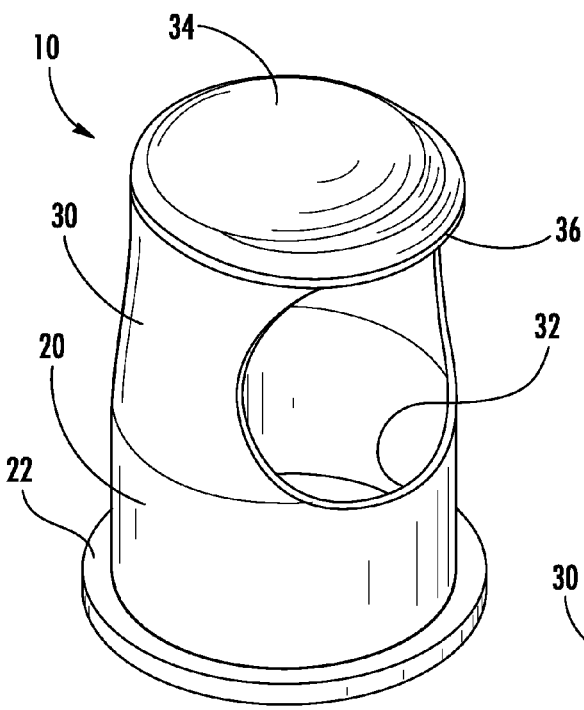
FIGS. 1A-1D are perspective, side, front and top views, respectively, of a livestock feeder in accordance with the subject matter herein.
Figure 1B:
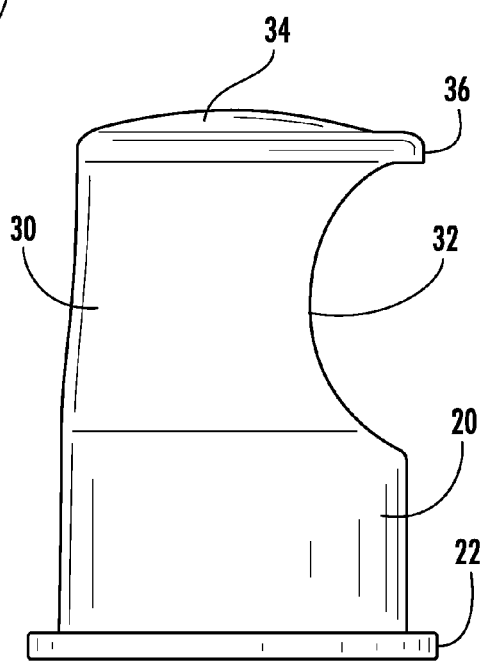
Figure 1C:
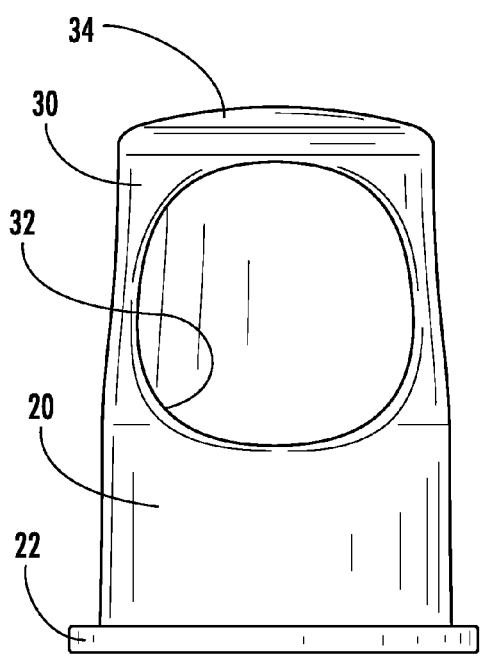
Figure 1D:
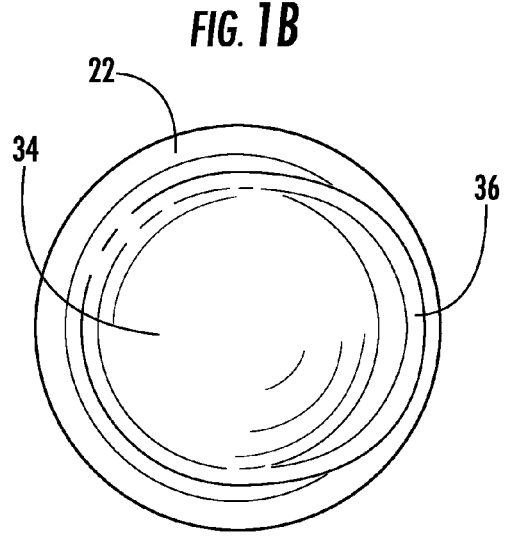
Figure 2E:
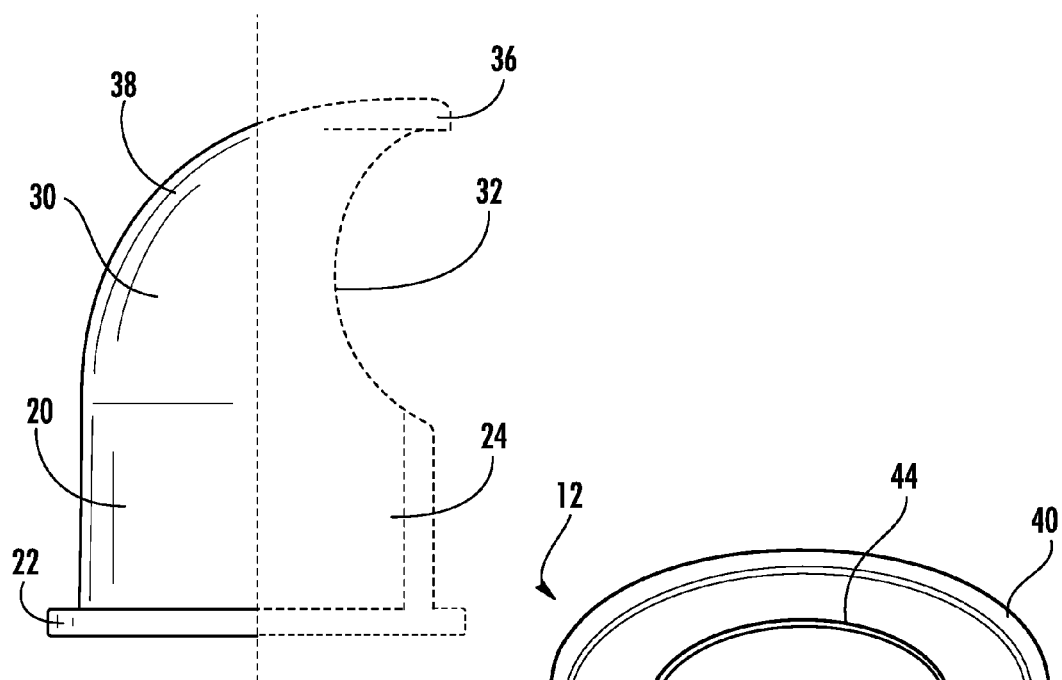
FIG. 2E is a cut-away side view of a livestock feeder in accordance with the subject matter herein.
Figure 2F:
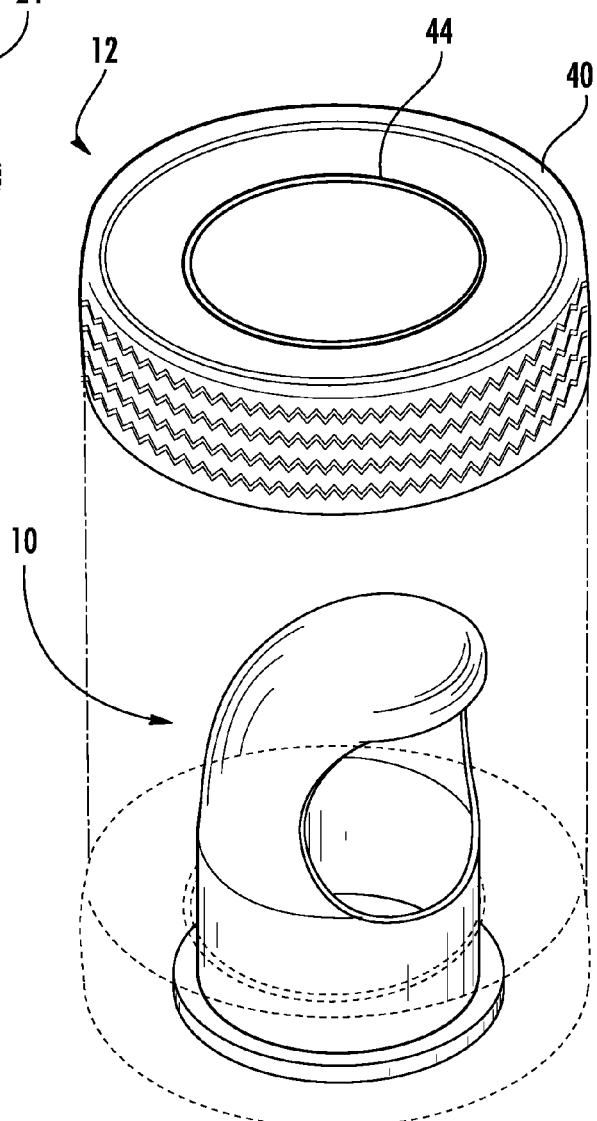
FIG. 2F is a schematic illustration of a livestock feeder in accordance with the subject matter herein, with a tire used as a base.

The subject matter disclosed herein provides livestock feeders. In some aspects or embodiments, the disclosed livestock feeders are suitable for providing nutritional supplements and other feedstuffs to various livestock species. A livestock feeder in accordance with the disclosure herein is designed to be durable, portable and resist being tipped over by livestock.

The livestock industry utilizes supplemental feeding to meet the nutritional needs of livestock, particularly grazing livestock such as cattle, sheep, goats, horses, bison and the like. Minerals, vitamins, salts and other nutrients are often provided to livestock as a supplement to their basal diet. For example, in an effort to optimize nutritional balance, grazing cattle are often provided with trace mineral and vitamin supplements to compensate for nutrient deficiencies in the grazing animal's diet. While they can be mixed with feed, supplements of this nature are often provided to livestock on an ad libitum or free-choice basis, particularly with grazing livestock. In some instances, this method is preferred because it can reduce labor costs, thereby making it a more economical and convenient approach.

In order to make such supplements available to livestock on a free-choice basis the supplements are typically provided in free-standing feeders that are freely accessible to the animals. Current feeders on the market, often referred to as "mineral feeders" in the livestock industry, suffer from numerous disadvantages and weaknesses, with the primary weaknesses being durability, portability and spill prevention. Currently available mineral feeders are often insufficiently designed to withstand long-term exposure to environmental elements and physical wear and tear from use by livestock. Currently available feeders often contain parts made of metal that is highly corrosive, particularly when in contact with salts and other minerals used in feedstuffs. Indeed, a common problem with existing mineral feeders is the inability to prevent spillage of the supplements or feedstuffs contained therein when used by the livestock. As such, the presently disclosed subject matter provides a livestock feeder that addresses these long-felt needs; namely a livestock feeder that is durable, portable and resists spillage, while being suitable for providing livestock with nutritional supplements.

I. DEFINITIONS

While the following terms are believed to be well understood by one of ordinary skill in the art, the following definitions are set forth to facilitate explanation of the presently disclosed subject matter.

Unless defined otherwise, all technical and scientific terms used herein have the same meaning as commonly understood to one of ordinary skill in the art to which the presently disclosed subject matter belongs. Although any methods, devices, and materials similar or equivalent to those described herein can be used in the practice or testing of the presently disclosed subject matter, representative methods, devices, and materials are now described.

Following long-standing patent law convention, the terms "a", "an", and "the" refer to "one or more" when used in this application, including the claims. Thus, for example, reference to "a fastener" includes a plurality of such fasteners, and so forth.

Unless otherwise indicated, all numbers expressing quantities, units of measure, and so forth used in the specification and claims are to be understood as being modified in all instances by the terms "about", "approximately" and "substantially". Accordingly, unless indicated to the contrary, the numerical parameters set forth in this specification and attached claims are approximations that can vary depending upon the desired properties sought to be obtained by the presently disclosed subject matter.

As used herein, the term "about," when referring to a value or to a weight, volume, distance, measurement, concentration, percentage, etc., is meant to encompass variations of in some embodiments ±20%, in some embodiments ±10%, in some embodiments ±5%, in some embodiments ±1%, in some embodiments ±0.5%, and in some embodiments ±0.1% from the specified amount, as such variations are appropriate with respect to the disclosed subject matter.

The term "comprising", which is synonymous with "including" "containing" or "characterized by" is inclusive or open-ended and does not exclude additional, unrecited elements or method steps. "Comprising" is a term of art used in claim language which means that the named elements are essential, but other elements can be added and still form a construct within the scope of the claim.

As used herein, the phrase "consisting of" excludes any element, step, or ingredient not specified in the claim. When the phrase "consists of" appears in a clause of the body of a claim, rather than immediately following the preamble, it limits only the element set forth in that clause; other elements are not excluded from the claim as a whole.

As used herein, the phrase "consisting essentially of" limits the scope of a claim to the specified materials or steps, plus those that do not materially affect the basic and novel characteristic(s) of the claimed subject matter.

With respect to the terms "comprising", "consisting of", and "consisting essentially of", where one of these three terms is used herein, the presently disclosed and claimed subject matter can include the use of either of the other two terms.

As used herein, the terms "feeder", "livestock feeder" and "mineral feeder" are used interchangeably and refer to an apparatus for providing a feed, feedstuff or supplement to an animal. "One-piece" and "multi-piece" feeders are described herein. A "one-piece" feeder can comprise a single structural piece comprising a pan and hood. A "one-piece" feeder can comprise a single or integral structural piece comprising a pan, hood and flange. A "one-piece" feeder can comprise a single structural piece comprising a pan, hood, flange and secured base.

A "multi-piece" feeder can comprise one or more separate but combinable structural pieces comprising a pan and hood. A "multi-piece" feeder can comprise one or more separate but combinable structural pieces comprising a pan, hood and flange. A "multi-piece" feeder can comprise one or more separate but combinable structural pieces comprising a pan, hood, flange and base. A "multi-piece" feeder can comprise one or more separate but combinable structural pieces comprising a pan, hood, thimble and base.

The terms "feed", "feedstuff", "nutritional component", "supplement" and "nutritional supplement" are used interchangeably throughout and refer to food to be consumed by animals such as livestock, and which can be provided in the disclosed feeder.

As used herein, the terms "free-choice" and "ad libitum" are used interchangeably and refer to a means of providing feedstuff or supplement to livestock in a manner that allows animals free access to the feedstuff or supplement thereby allowing the animals to self-regulate intake according to biological needs.

II. LIVESTOCK FEEDER

Referring to FIGS. 1A-1F, a livestock feeder 10 can comprise a pan 20, a hood 30, and an opening 32. In some embodiments, a feeder 10 as disclosed herein can further comprise a base 12, as discussed and shown further hereinbelow. Pan 20 can comprise a cylindrical shaped pan that can include a bottom and sides forming a generally cylindrical outer periphery and recessed inner receptacle 24 for holding feedstuffs. Inner receptacle 24 is further illustrated in the cut-away view in FIG. 1E. In some aspects, pan 20 can further comprise a flange 22 extending outward from the bottom of feeder 10.

In some aspects, hood 30 can comprise a substantially cylindrical member affixed to and extending vertically from pan 20. Hood 30 can be designed to substantially cover and shield inner receptacle 24 of pan 20. By covering and shielding inner receptacle 24 of pan 20, hood 30 acts to protect or substantially protect from environmental elements, e.g., precipitation, wind, and sun exposure, the contents or supplemental feedstuffs contained in inner receptacle 24 of pan 20 that are to be consumed by livestock. In some aspects, hood 30 can comprise a domed lid 34, wherein lid 34 can comprise an overhang 36 extending horizontally from hood 30 and above opening 32 of hood 30.

In some embodiments, hood 30 can comprises a sloped rear portion 38 substantially opposite opening 32 of hood 30, as illustrated in FIGS. 2A-2F. The hood 30 with a sloped rear portion 38 can shed water from the top of feeder 10. In either case, a livestock feeder 10 as disclosed herein with a domed lid 34 on hood 30 (FIGS. 1A-1F), or a hood 30 with a sloped rear portion 38 (FIGS. 2A-2F), is designed to substantially protect the feedstuffs in the pan 20 of the feeder 10 while allowing access to the feedstuffs by livestock.

As illustrated in FIGS. 1A-1F, feeder 10 can also comprise an opening 32 in hood 30 of a size sufficient to permit livestock to have access therethrough to inner receptacle 24 of pan 20. Opening 32 in hood 30 can be a substantially circular cut-out from one side of hood 30 extending vertically from pan 20, as shown in FIGS. 1A-1F. However, as can be appreciated by one of ordinary skill in the art, opening 32 can be substantially square, rectangular or any other shape so long as the size of opening 32 is sufficient to permit livestock to access the feedstuffs in inner receptacle 24 of pan 20. In some aspects, hood 30 has one opening 32, and pan 20 to which hood 30 is affixed has no opening.

As illustrated in FIGS. 1A-1F and 2A-2F, in some aspects a feeder 10 as disclosed herein can be a one-piece design. That is, feeder 10 comprising a pan 20, hood 30 and opening 32 can be constructed as a single, integral piece. In some aspects, a feeder 10 of a one-piece design can be made from a mold or cast using any number of moldable materials as discussed hereinbelow.

Alternatively, referring to FIGS. 3A-3D and 4A-4D, a feeder 10 disclosed herein can comprise a multi-piece feeder 10'. That is, feeder 10' can comprise a pan 20' and hood 30' with opening 32', wherein pan 20' and hood 30' are separate pieces. In some aspects, a multi-piece feeder 10' can comprise one or more separate but combinable structural pieces comprising a pan 20' and hood 30'. In some aspects, a multi-piece feeder 10' can comprise one or more separate but combinable structural pieces comprising a pan 20', hood 30' and flange 22'. In some aspects, a multi-piece feeder 10' can comprise one or more separate but combinable structural pieces comprising a pan 20', hood 30', flange 22' and base 12'. In some aspects, a multi-piece feeder 10' can comprise one or more separate but combinable structural pieces comprising a pan 20', hood 30', thimble 26' and base 12'. In some aspects, the pan 20', hood 30' and base 12' of a multi-piece feeder 10' can each be made from a mold or cast using any number of moldable materials as discussed hereinbelow.

As illustrated in FIGS. 3A-3D and 4A-4D, pan 20' can comprise a cylindrical shaped pan having a bottom and sides forming a generally cylindrical outer periphery and recessed inner receptacle 24' for holding feedstuffs. Inner receptacle 24' is further illustrated in the cut-away view in FIGS. 3B and 4B. In some aspects, pan 20' can further comprise a flange 22' extending outward from the bottom of feeder 10'.

Figure 3A:
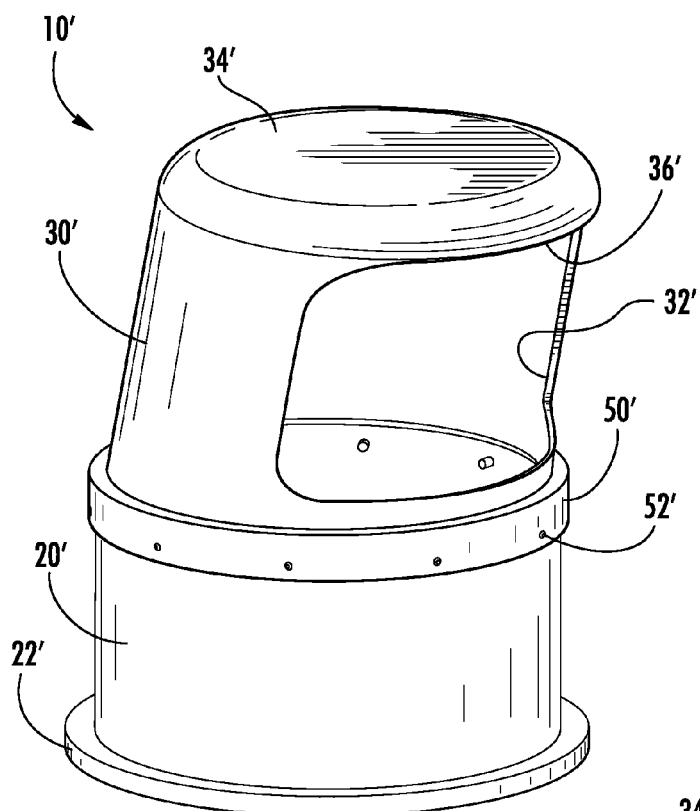
FIGS. 3A-3C are perspective, cut-away, and exploded views, respectively, of a multi-piece livestock feeder in accordance with the subject matter herein.
Figure 3B:
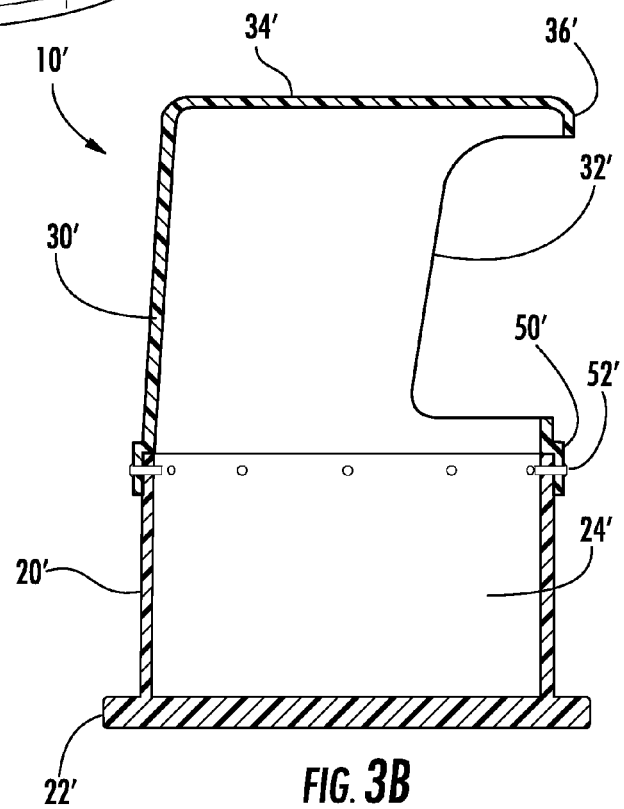
Figure 3C:
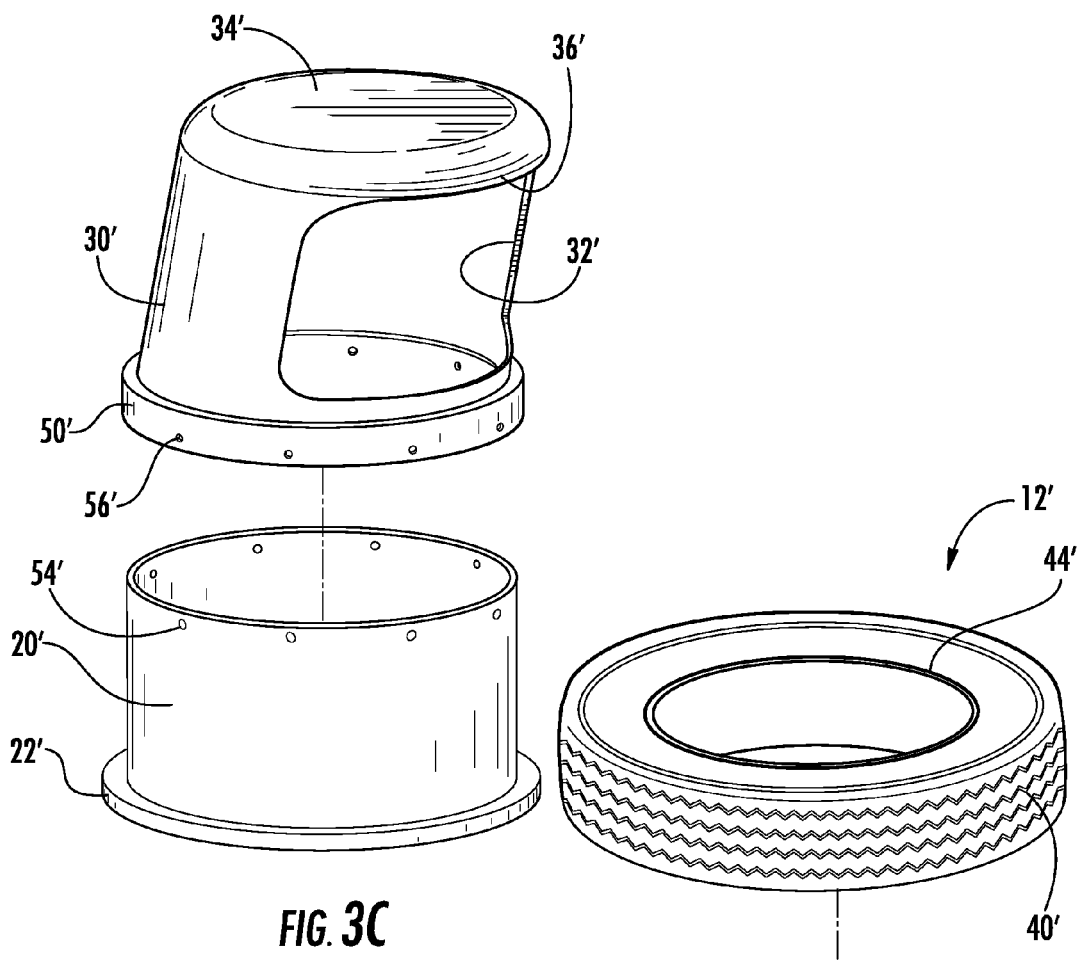
Figure 3D:
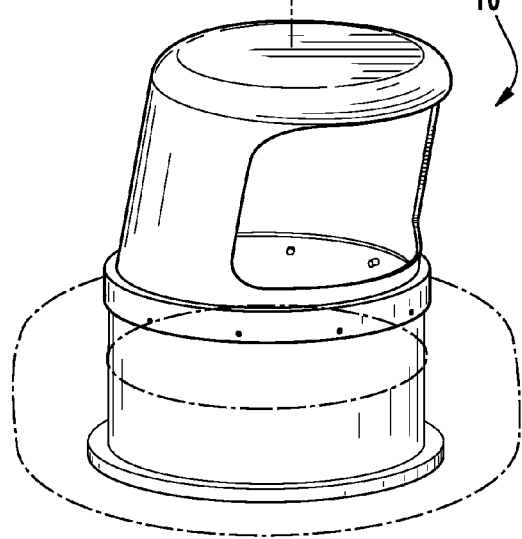
FIG. 3D is a schematic illustration of a multi-piece livestock feeder in accordance with the subject matter herein, illustrating use of the feeder with a tire used as a base.
Figure 4A:
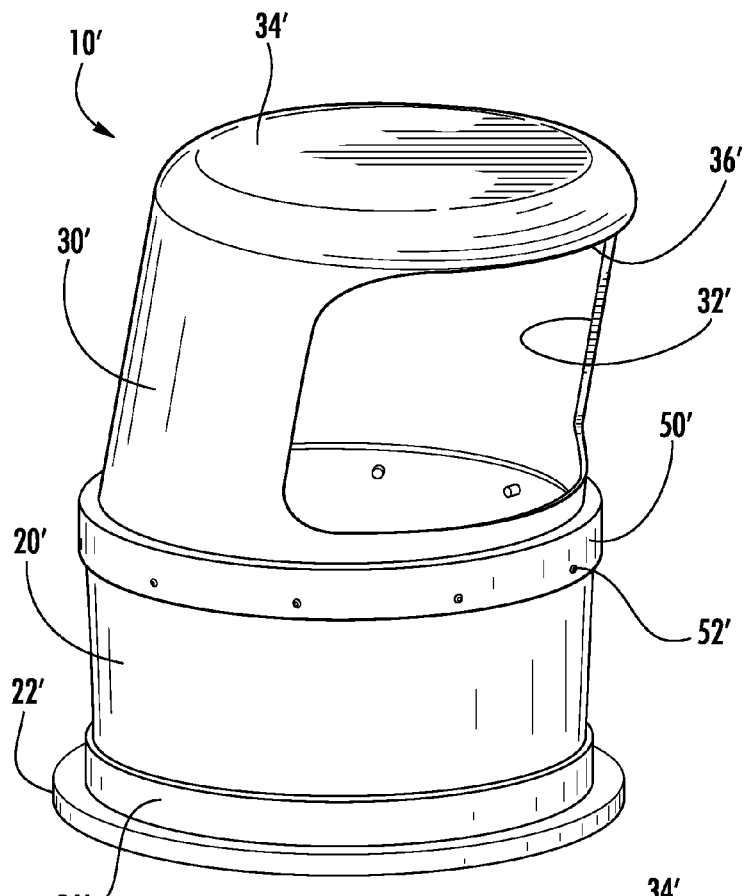
FIGS. 4A-4C are perspective, cut-away, and exploded views, respectively, of a multi-piece livestock feeder in accordance with the subject matter herein.
Figure 4B:
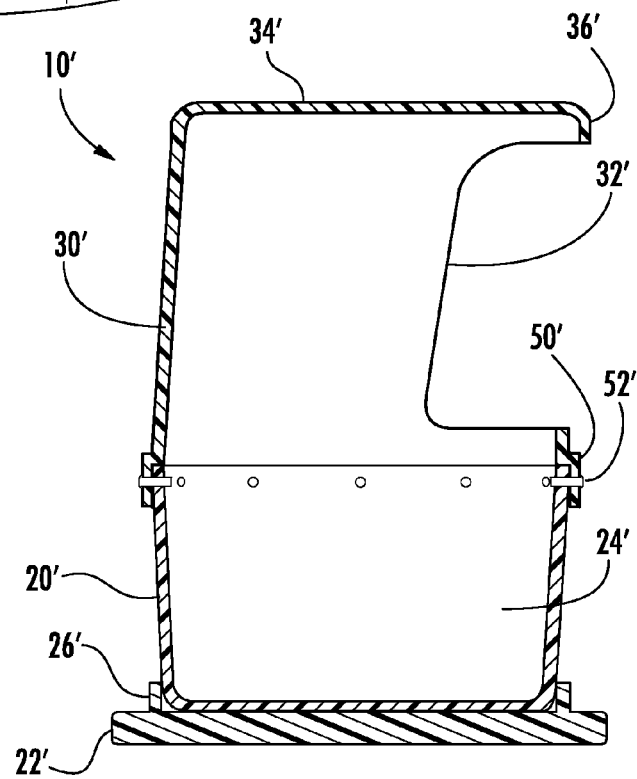
Figures 4C, 4D:
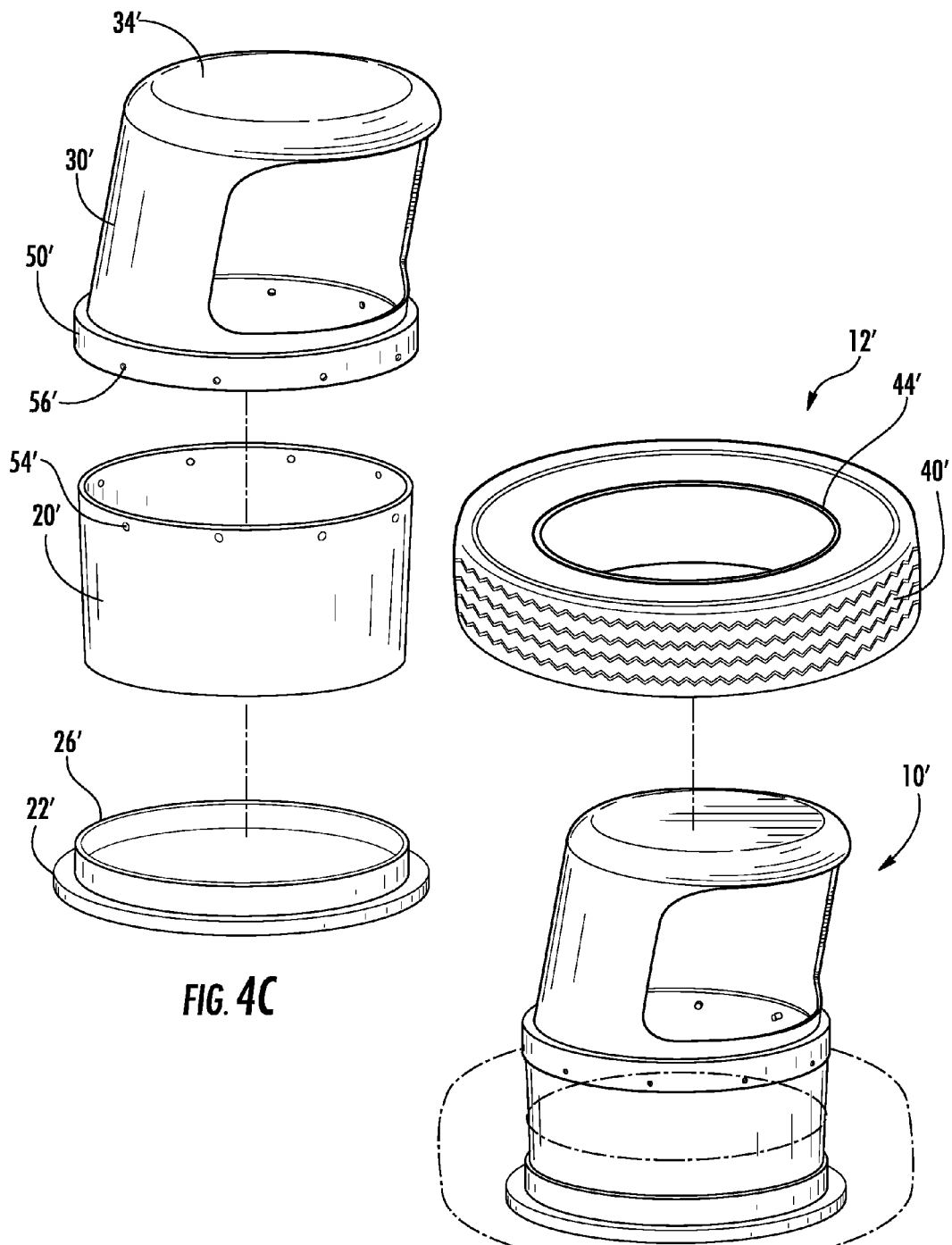
FIG. 4D is a schematic illustration of a multi-piece livestock feeder in accordance with the subject matter herein, illustrating the use of the feeder with a tire used as a base.

In some aspects, hood 30' can comprise a substantially cylindrical member that can be affixed to the top of pan 20', as illustrated in FIGS. 3C and 4C. Hood 30' can be designed to substantially cover and shield inner receptacle 24' of pan 20'. By covering and shielding inner receptacle 24' of pan 20', hood 30' acts to protect or substantially protect from environmental elements, e.g., precipitation, wind, and sun exposure, the contents or supplemental feedstuffs contained in inner receptacle 24' of pan 20' that are to be consumed by livestock. In some aspects, hood 30' can comprise a domed lid 34', wherein lid 34' can comprise an overhang 36' extending horizontally from hood 30' and above opening 32' of hood 30'.

In some embodiments, hood 30' of a multi-piece feeder 10' can comprise a sloped rear portion 38' substantially opposite opening 32' of hood 30', as illustrated for example and without limitation in FIGS. 2A-2E. Hood 30' with a sloped rear portion 38' can shed water from the top of feeder 10'. In either case, a livestock feeder 10' as disclosed herein with a domed lid 34' on hood 30' (FIGS. 3A-3D and 4A-4D), or a hood 30' with a sloped rear portion 38' (FIGS. 2A-2E), is designed to substantially protect the feedstuffs in pan 20' of feeder 10' while allowing access to the feedstuffs by livestock.

As illustrated in FIGS. 3A-3D and 4A-4D, the feeder 10' can also comprise an opening 32' in hood 30' of a size sufficient to permit livestock to have access therethrough to inner receptacle 24' of pan 20'. Opening 32' in hood 30' can be a substantially circular cut-out from one side of hood 30' extending vertically from pan 20', as shown in FIGS. 3A-3D and 4A-4D. However, as would be appreciated by one of ordinary skill in the art, opening 32' can be substantially square, rectangular or any other shape so long as the size of the opening is sufficient to permit livestock to access the feedstuffs in inner receptacle 24' of pan 20'.

Referring to FIGS. 3B-3C and 4B-4C, a multi-piece feeder 10' can comprise a pan 20' having a diameter substantially similar to the diameter of hood 30', such that hood 30 can rest on top of and be affixed to the pan 20'. In some aspects, hood 30' can further comprise a lip 50' having a diameter greater than the diameter of pan 20', such that lip 50' of hood 30' extends over the outer periphery of the pan 20' when hood 30' rests on top of pan 20'. In some aspects, a fastening device generally designated 52' can be used to attach hood 30' to pan 20'. By way of example and without limitation, a fastening device 52' can comprise a bolt, screw, rivet or fastener. In some aspects, fastening device 52' can comprise stainless steel to minimize corrosion.

In some aspects, and as illustrated in FIGS. 3C and 4C, pan 20' can have pre-drilled holes 54', that in some aspects can match up to pre-drilled holes 56' in lip 50' of hood 30', such that a fastening device 52' can pass through lip 50' of hood 30' and pan 20' to thereby secure hood 30' to pan 20'. In some embodiments, holes can be drilled through lip 50' and pan 20' by a user in order to secure hood 30 to pan 20'. In some embodiments, pre-drilled holes 56' can further comprise a built-in nut to which a fastening device 52' such as a bolt can be secured.

In some aspects, the lip 50' can create a water-tight or substantially water-tight seal between hood 30' and pan 20' so as to prevent and/or minimize rain and other water or moisture from entering inner receptacle 24' of pan 20' through the point of attachment between hood 30' and pan 20'.

Referring to FIGS. 4A-4D, in some aspects a multi-piece feeder 10' can comprise a pan 20', hood 30' and thimble 26'. Thimble 26' can comprise a flange 22'. In some aspects, thimble 26' can have a diameter sufficient to allow thimble 26' to slidingly engage the bottom of the outer periphery of pan 20'. In effect, thimble 26' allows for flange 22' to be removable from pan 20' to facilitate the application and/or removal of a base 40' as discussed further hereinbelow. In some embodiments, thimble 26' can be affixed to pan 20' using threads or tabs molded into thimble 26' and pan 20'. In some aspects, the inner diameter of thimble 26' and outer diameter of pan 20' can have matching threads such that thimble 26' can be threaded onto the bottom of pan 20'. In some aspects, the inner diameter of thimble 26' can have slots that slidingly engage tabs on the outer diameter of pan 20' such that thimble 26' can engage pan 20' by sliding thimble 26' onto the bottom of pan 20' by matching up the slots and tabs and then turning thimble 26' to lock it into place.

A feeder 10 or 10' can be made in a range of different sizes depending on the use. For example, a feeder 10 or 10' for use by cattle could be larger than a feeder 10 or 10' for use by sheep or goats. A larger feeder 10 or 10' can provide a larger pan 20 that can hold more feedstuffs. Thus, as would be appreciated by one of ordinary skill in the art, the size of the feeder can vary depending on the intended use, without departing from the scope of the instant disclosure. By way of example and not limitation, both the one-piece feeder 10 (FIGS. 1A-1F and 2A-2F) and multi-piece feeder 10' (FIGS. 3A-3D and 4A-4D), can be about 25 inches to about 50 inches tall. In some aspects, a feeder 10 or 10' can be about 14 inches to about 30 inches in diameter, and have an opening 32 in the hood 30 of about 10 inches to about 20 inches in diameter. A feeder 10 or 10' can have a pan 20 that is about 10 inches to about 20 inches tall, and 14 inches to about 30 inches in diameter. The pan 20 can have an inner receptacle 24 suitable for receiving and containing from about 1 pound to about 300 pounds of feedstuff. A feeder 10 or 10' can have a hood 30 that is about 15 inches to about 30 inches tall, and about 15 inches to about 30 inches in diameter.

In some aspects, the diameter of the feeder 10 or 10' can vary from top to bottom. In particular, the outside diameter can decrease slightly from the bottom of the feeder, i.e. near the pan 20, to the top of the feeder 10, i.e. near the hood 30, such that the feeder 10 or 10' is slightly tapered from bottom to top. Likewise, in some aspects the inside diameter can decrease slightly from the bottom of the feeder, i.e. near the pan 20, to the top of the feeder 10, i.e. near the hood 30, such that the feeder 10 or 10' is slightly tapered from bottom to top. In some aspects, the outside diameter and the inside diameter of pan 20 is substantially similar from top to bottom and does not taper. In some aspects, the outside diameter and the inside diameter of hood 30 tapers from bottom to top, whereas the outside diameter and the inside diameter of pan 20 is substantially similar from the bottom of pan 20 to the top of pan 20. In some aspects, the point at which the outside and/or inside diameter of feeder 10 or 10' begins to taper is about one half the distance up the feeder as measured from the bottom of pan 20. That is, about half way up feeder 10 or 10', where pan 20 or 20' and hood 30 or 30' meet, the outside diameter, and in some embodiments inside diameter, begins to taper such that hood 30 or 30' is slightly tapered as compared to pan 20 or 20'. In some aspects, the point at which the outside and/or inside diameter of feeder 10 or 10' begins to taper is about one third the distance up the feeder as measured from the bottom of pan 20 or 20'. In some aspects, the point at which the outside and/or inside diameter of feeder 10 or 10' begins to taper is about two thirds the distance up the feeder as measured from the bottom of pan 20 or 20'. In some aspects, the point at which the outside and/or inside diameter of feeder 10 or 10' begins to taper coincides with the bottom of opening 32 or 32'.

By way of example and not limitation, a feeder such as feeder 10 or 10' can comprise: a pan 20 that is 23 inches in diameter; a hood 30 affixed to and extending vertically from the pan 20 and tapering slightly in diameter; a total height of 36 inches including the pan 20 and hood 30; a flange 22 that is 27 inches in diameter; and an 18 inch diameter opening 32 on one side of the hood 30 approximately 15 inches above the flange 22. Such a feeder 10 can be suited for use with a base 12 comprising a tire 40 having an inner diameter 44 of 24.5 inches, as discussed further below.

By way of example and not limitation, a feeder such as feeder 10 or 10' can comprise: a pan 20 that is 21 inches in diameter; a hood 30 affixed to and extending vertically from the pan 20 and tapering slightly in diameter; a total height of 36 inches including the pan 20 and hood 30; a flange 22 that is 25 inches in diameter; and an 18 inch diameter opening 32 on one side of the hood 30 approximately 15 inches above the flange 22. Such a feeder 10 can be suited for use with a base 12 comprising a tire 40 having an inner diameter 44 of 22.5 inches, as discussed further below.

As would be appreciated by one of ordinary skill in the art, mineral feeders and the like can often be tipped over, pushed around and knocked about by livestock when the animals are using the feeder. The force applied by the animals can result in spillage of the feedstuffs therein and/or damage to the feeder itself. Nutritional supplements and other feedstuffs intended to be used in a feeder 10 of the presently disclosed subject matter can be costly. Thus, a feeder that can prevent or minimize spillage and waste is important for cost-effective livestock production. Moreover, a feeder that cannot withstand the forces applied by the animals will not only shorten the useful lifespan of the feeder, but may present a risk of harm to the animals themselves. Further, bulls, for example, can be particularly harmful to feeders due to their size, strength and more aggressive behavior. Thus, a feeder 10 as disclosed herein is designed to be durable, maintain and upright position when in use by livestock, and prevent or reduce spillage of the feedstuffs. That is, the feeder 10 is designed to be "bull-proof".

In particular, a feeder 10 as disclosed herein comprising a base 12 or used in conjunction with a base 12 can provide for a feeder that is less likely to tip over and more likely to maintain an upright position upon the application of force by livestock. The increased stability provided by base 12 minimizes, reduces or prevents spillage and waste of the feedstuffs in the inner receptacle 24 of the pan 20, and increases the durability and longevity of the feeder 10 as compared to other feeder designs.

Referring for example to FIGS. 1F, 2F, 3D, 4D, 5A and 6A, a livestock feeder 10 or 10' as disclosed herein, whether one-piece or multi-piece design, can further comprise a base 12. In some aspects, and as illustrated in FIGS. 1F, 2F, 3D and 4D, base 12 can comprise a tire 40. Base 12 can also comprise a base plate (42 or 46) slidingly engaged to or affixed to the bottom of pan 20, as illustrated in FIGS. 5A-5B and 6A-6B. Base 12, whether a tire 40 or base plate (42 or 46), acts as and is an anti-tipping mechanism to maintain feeder 10 in an upright position upon the application of force by livestock. Base 12 adds both weight to feeder 10 and frictional contact with the surface of the ground. The added weight and friction prevents or minimizes feeder 10 from being tipped over and/or pushed around by the livestock.

Referring to FIGS. 1F, 2F, 3D, 4D and 5A, in some aspects base 12 can comprise a structure having a circular opening 44 with a diameter substantially similar to the diameter of the outer periphery of feeder 10, and particularly pan 20, whereby base 12 can slide over the top of feeder 10 and come to rest near the bottom of the outer periphery of pan 20 such that circular opening 44 of base 12 engages the outer periphery of pan 20. By way of example and not limitation, if the outer periphery of pan 20 is 20 inches in diameter, circular opening 44 in base 12 can be about 21 to about 23 inches in diameter. Likewise, if the outer periphery of pan 20 is 30 inches in diameter, circular opening 44 in base 12 can be about 31 to about 33 inches in diameter. Thus, the diameter of circular opening 44 of base 12 can, for example, be about 21 to about 33 inches in diameter.

In some aspects, flange 22 at the bottom of pan 20 can have a diameter greater than the diameter of circular opening 44 of base 12, whereby base 12 can slidingly engage the outer periphery of pan 20 and come to rest near the bottom of the outer periphery of pan 20 while abutting against the flange 22. That is, flange 22 allows base 12 to engage the bottom of pan 20 while also contacting the surface of the ground, while preventing base 12 from sliding off the bottom of pan 22. By way of example and not limitation, if the outer periphery of pan 20 is 20 inches in diameter, and circular opening 44 in base 12 is about 21 inches in diameter, the diameter of flange 22 can be about 22 to 24 inches in diameter. Likewise, if the outer periphery of pan 20 is 30 inches in diameter, and circular opening 44 in base 12 is about 31 inches in diameter, the diameter of flange 22 can be about 32 to 34 inches in diameter. Thus, the diameter of the flange 22 can be about 22 to about 34 inches in diameter.

Referring to FIGS. 1F, 2F, 3D, 4D, 7, 8 and 9, base 12 can be a tire 40. While the base of the feeder can include a variety of large heavy objects, tires, particularly used tires, can prove to be useful due to the fact that they not only provide weight but provide good frictional contact with the ground, thereby stabilizing the feeder 10 so as to prevent sliding and tipping over. Moreover, feeders 10 and 10' as disclosed herein have been designed to be suitable for use with used tires as the base 12 in an effort to provide an environmentally friendly aspect, i.e. "green" feature, by repurposing discarded and otherwise unusable tires so as to prevent such tires from entering the landfill systems. This aspect may prove to be especially beneficial to organic and/or environmentally sustainable farming and agricultural operations.

Figure 7:
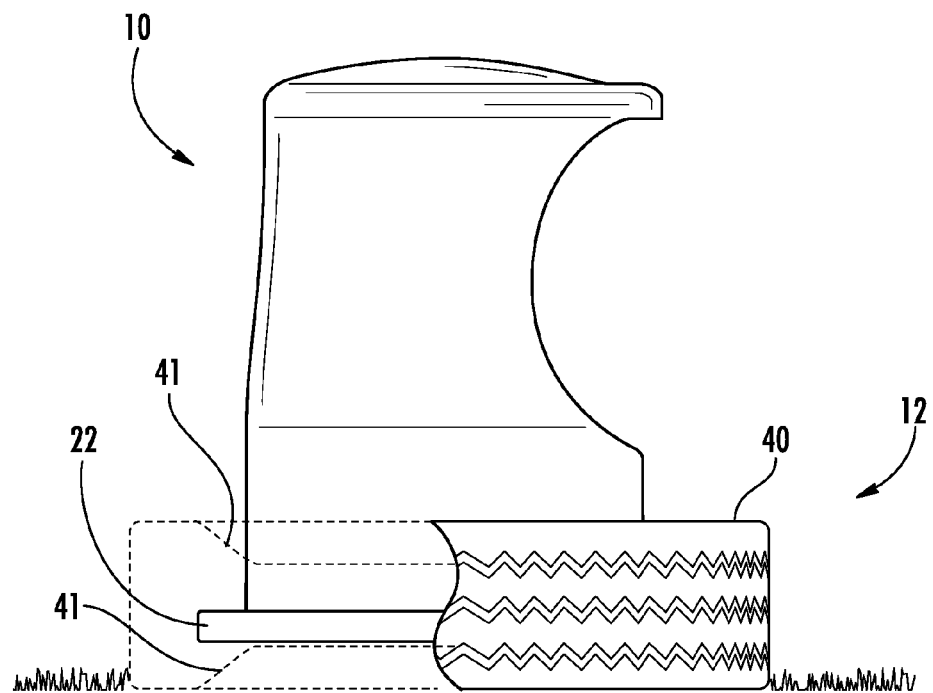
FIG. 7 illustrates a livestock feeder in accordance with the subject matter herein in use.
Figure 8:
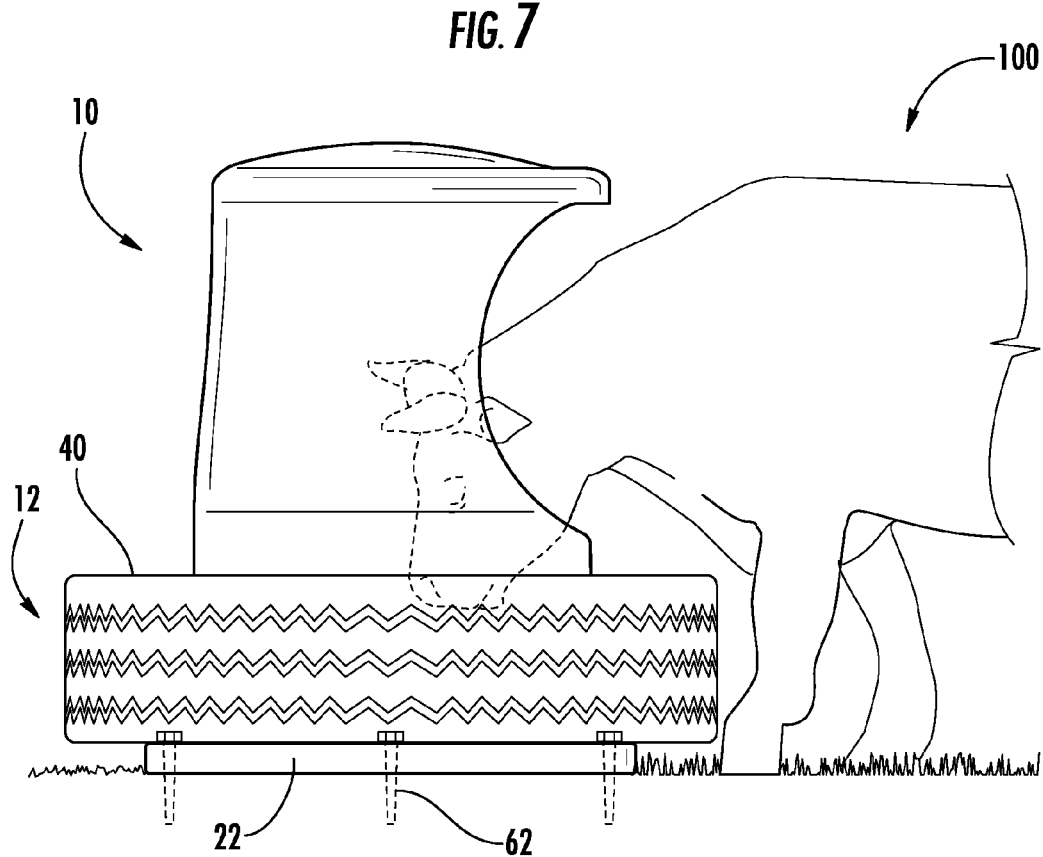
FIG. 8 illustrates a livestock feeder in accordance with the subject matter herein in use.

A tire 40 used as a base 12 can be lifted over the top of feeder 10 or 10' and lowered to the bottom of feeder 10 or 10' near pan 20 such that tire 40 comes to rest on the ground with feeder 10 or 10' projecting up through opening 44 of tire 40. See, e.g., FIGS. 1F, 2F, 3D, and 4D. As illustrated in FIG. 7, in some aspects feeder 10 or 10' can be engaged to tire 40 such that flange 22 of feeder 10 or 10' can come to rest between the inner walls 41 of tire 40 such that the bottom of feeder 10 or 10' is secured within tire 40 but not touching the surface of the ground. As illustrated in FIG. 8, in some aspects tire 40 slides over the top of feeder 10 or 10' and comes to rest on flange 22 such that both tire 40 and the bottom of feeder 10 or 10' is in contact with the ground. FIG. 8 illustrates a feeder 10 in use by a cow 100 with a tire 40 serving as the base 12.

By way of example and not limitation, 24.5 inch tires (24.5 inches represents the inner diameter or wheel size of the tire) can be used as base 12 since they are a common size and widely used on many farming and agricultural operations. For example, a 24.5 inch tire could be used as a base 12 on a feeder 10 or 10' having a diameter of about 20 inches to about 24 inches. Likewise, 22.5 inch tires (22.5 inches represents the inner diameter or wheel size of the tire) can be used as base 12 since they are also a common size and widely used on many farming and agricultural operations. For example, a 22.5 inch tire could be used as a base 12 on a feeder 10 having a diameter of about 18 inches to about 22 inches. In some aspects, 15 or 16 inch tires can be used as a base 12 on a feeder 10. While 15, 16, 24.5 and 22.5 inch tires are contemplated for use as a base 12 with the disclosed feeders 10 or 10', one of ordinary skill in the art will appreciate that virtually any size tire can be used as a base 12 so long as inner diameter 44 of tire 40 is of a sufficient size to allow tire 40 to slide over the top of feeder 10 or 10'.

In some aspects, base 12 can also comprise a base plate (42 or 46) slidingly engaged to or affixed to the bottom of pan 20, as illustrated in FIGS. 5A-5B and 6A-6B. A base 12 comprising a base plate (42 or 46) acts as and is an anti-tipping mechanism to maintain the feeder 10 or 10' in an upright position upon the application of force by livestock. A base 12 comprising a base plate (42 or 46) adds both weight to feeder 10 and frictional contact with the surface of the ground. The added weight and friction prevents or minimizes feeder 10 or 10' from being tipped over and/or pushed around by the livestock.

Figure 5A:
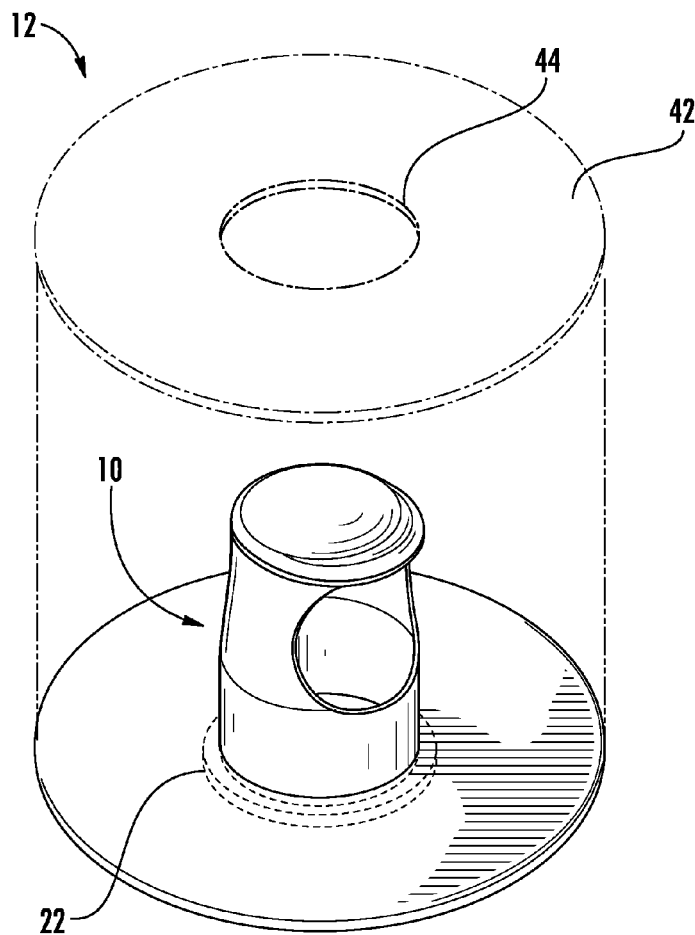
FIG. 5A is a schematic illustration of a livestock feeder in accordance with the subject matter herein, illustrating use of the feeder with a sliding base plate.
Figure 5B:
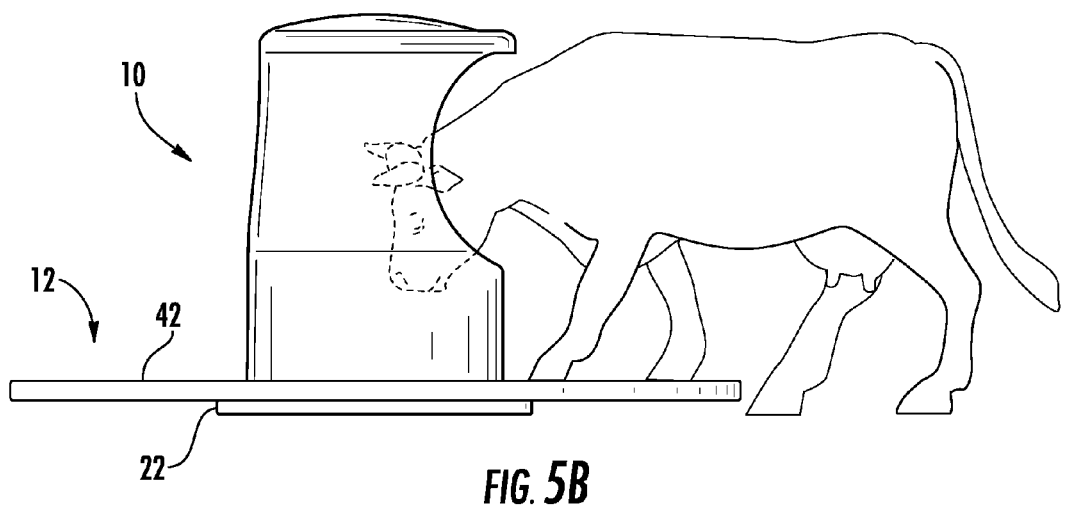
FIG. 5B illustrates the livestock feeder of FIG. 5A in use.

Referring to FIGS. 5A and 5B, a base plate 42 utilized as a base 12 can comprise a substantially planar structure having a circular opening 44 with a diameter substantially similar to the diameter of the outer periphery of feeder 10 or 10', and particularly pan 20, whereby base plate 42 can slide over the top of feeder 10 or 10' and come to rest near the bottom of the outer periphery of pan 20 such that the circular opening of the base plate 42 engages the outer periphery of pan 20. By way of example and not limitation, if the outer periphery of pan 20 is 20 inches in diameter, the circular opening 44 of a base plate 42 can be about 21 to about 23 inches in diameter. Likewise, if the outer periphery of pan 20 is 30 inches in diameter, circular opening 44 of plate 42 can be about 31 to about 33 inches in diameter. Thus, the diameter of the circular opening 44 of a base plate 42 can be about 21 to about 33 inches in diameter. The outer diameter of a base plate 42 can be about 3 feet to about 6 feet. The thickness of base plate 42 can be about 0.5 inches to about 2.0 inches.

In some aspects, flange 22 at the bottom of pan 20 can have a diameter greater than the diameter of circular opening 44 of a base plate 42, wherein the base plate 42 can slidingly engage the outer periphery of pan 20 and come to rest near the bottom of the outer periphery of pan 20 while abutting against flange 22. By way of example and not limitation, if the outer periphery of pan 20 is 20 inches in diameter, and the circular opening 44 of a base plate 42 is about 21 inches in diameter, the diameter of flange 22 can be about 22 to 24 inches in diameter. Likewise, if the outer periphery of the pan 20 is 30 inches in diameter, and circular opening 44 of a base plate 42 is about 31 inches in diameter, the diameter of flange 22 can be about 32 to 34 inches in diameter. Thus, the diameter of flange 22 can be about 22 to about 34 inches in diameter.

A base plate 42 used as a base 12 can be lifted over the top of feeder 10 and lowered to the bottom of the feeder 10 or 10' near pan 20 such that base plate 42 comes to rest on the ground with feeder 10 or 10' projecting up through opening 44 of base plate 42. See, e.g., FIGS. 5A and 5B. FIG. 5B illustrates a feeder 10 or 10' in use by a cow 100 with a base plate 42 serving as base 12. Of note, in some aspects the use of a base plate 42 as a base 12 for a feeder 10 will permit the animal 100 using the feeder 10 or 10' to stand on plate 42 while feeding. See, e.g., FIG. 5B. This aspect can add additional stability to feeder 10 or 10' as the weight of the animal on base 12 will act to further stabilize feeder 10 or 10' in its upright position.

Figure 6A:
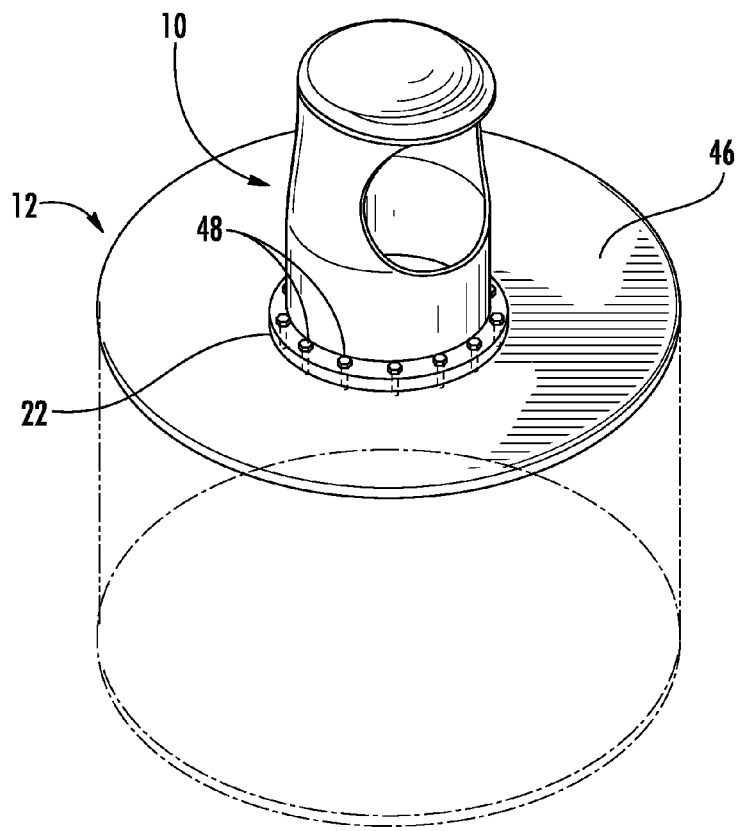
FIG. 6A is a perspective view of a livestock feeder in accordance with the subject matter herein, illustrating the use of the feeder with an affixed base plate.
Figure 6B:
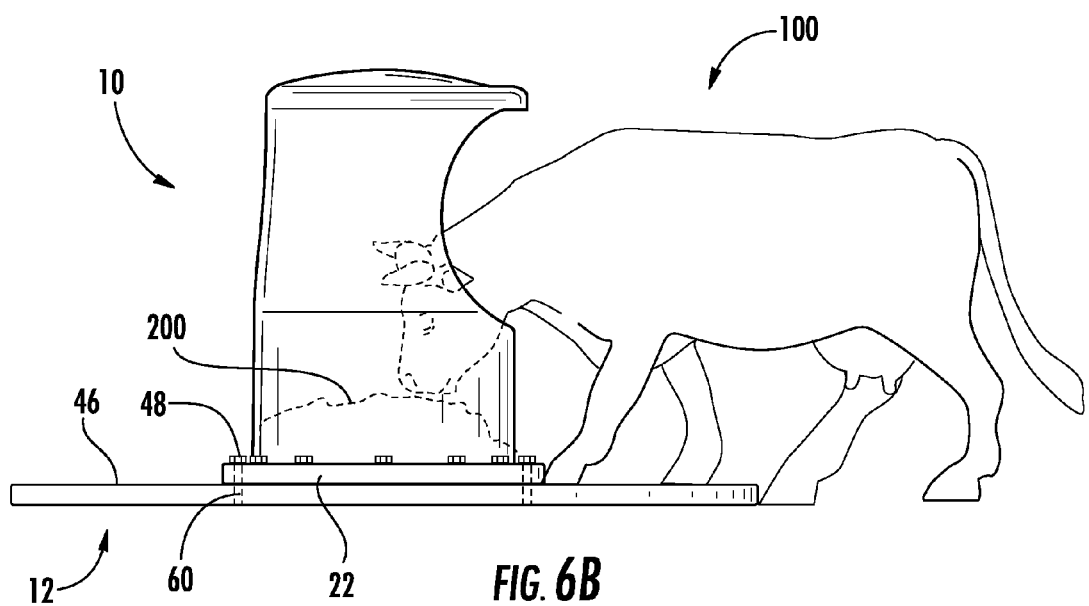
FIG. 6B illustrates the livestock feeder of FIG. 6A in use.

Referring to FIGS. 6A and 6B, a base plate 46 utilized as a base 12 can be affixed to the bottom of feeder 10 or 10'. The outer diameter of a base plate 46 can be about 3 feet to about 6 feet. The thickness of the base plate 46 can be about 0.5 inches to about 2.0 inches.

A base plate 46 used as a base 12 can be affixed to the bottom of a feeder 10 using a fastening device 48, such as bolts, screws, rivets or fasteners. In some aspects, a fastening device 48 can pass through flange 22 and base plate 46 to thereby affix the base plate 46 to feeder 10 or 10', as illustrated in FIGS. 6A and 6B. In some aspects flange 22 can have pre-drilled holes 60 that in some aspects can match up to pre-drilled holes 60 in base plate 46, such that a fastening device 48 can pass through flange 22 of pan 20 and base plate 46 to thereby secure base plate 46 to feeder 10. In some embodiments, holes can be drilled through flange 22 and base plate 46 by a user in order to secure base plate 46 to feeder 10. In some embodiments, pre-drilled holes 60 can further comprise a built-in nut to which a fastening device 48 such as a bolt can be secured.

FIG. 6B illustrates a feeder 10 or 10' in use by a cow 100 with a base plate 46 serving as the base 12. Of note, in some aspects the use of a base plate 46 as a base 12 for a feeder 10 or 10' will permit the animal 100 using feeder 10 or 10' to stand on base plate 46 while feeding. See, e.g., FIG. 6B. This aspect can add additional stability to feeder 10 or 10' as the weight of the animal 100 on base 12 will act to further stabilize the feeder 10 or 10' in its upright position.

As an added benefit, a feeder 10 or 10' as disclosed herein comprising a base 12 or used in conjunction with a base 12 can be easier to transport or move from one location to another. Due to the increased stability afforded by a base 12, a feeder 10 or 10' with a tire 40 as a base 12, or base plate 42 or 46, can be moved from one location to another by pushing or pulling the feeder 10 or 10'. By way of example and not limitation, a rope or chain can be attached to the feeder 10 or 10', or base 12, and the feeder 10 or 10' can be pulled by hand or towed by a vehicle, e.g., ATV, truck or tractor. Base 12 provides stability to prevent the feeder 10 or 10' from tipping and allows feeder 10 or 10' to slide across the ground. The portability of the feeder can be advantageous where it is used in a rotational grazing program where the livestock are often moved from one paddock or pasture to another. Frequent feeder movement can also prevent pasture damage during wet weather.

Both the one-piece feeder 10 (FIGS. 1A-1F and 2A-2F) and multi-piece feeder 10' (FIGS. 3A-3D and 4A-4D), as well as base plates 42 and 46 used as bases 12, can be made using a casting or molding method. In some aspects, a feeder 10 of a one-piece design can be molded from any number of moldable materials, such as plastic materials, rubber materials, or concrete. Likewise, each piece, e.g., pan, hood and thimble, of a multi-piece feeder 10' can be molded from any number of moldable materials. The base plates 42 and 46 can also be molded from any number of moldable materials. The thickness of the sides, top and bottom of a molded feeder 10 or 10' can range from about 0.5 inches to about 2.0 inches. In some aspects, the feeders 10 or 10' and bases 42 and 46 disclosed herein can be molded from a plastic material or plastic compound. By way of example and not limitation, a feeder 10 or 10' and bases 42 and 46 can be molded from polyethylene, or composite material comprising polyethylene. However, as would be appreciated by one of ordinary skill in the art, a feeder 10 or 10' and bases 42 and 46 of the presently disclosed subject matter can be constructed of any other polymer or copolymer without departing from the scope of the instant application.

In some aspects, a feeder 10 or 10' and bases 42 and 46 as disclosed herein can be constructed of a material, e.g., polyethylene, that is resistant to ultra violet (UV) radiation or is substantially UV-resistant. By using a UV-resistant material the durability and lifespan of a feeder 10 or 10' and bases 42 and 46 can be substantially increased, particularly since such feeders are often used outdoors with significant exposure to UV radiation from sunlight.

Moreover, a feeder 10 or 10' and bases 42 and 46 can be constructed of a material, e.g., polyethylene, that resists corrosion. The use of a corrosion-resistant material can substantially increase the durability and lifespan of a feeder 10 or 10' and bases 42 and 46. The non-corrosive material also makes the feeder 10 or 10' virtually maintenance free. The material and construction of feeder 10 or 10' also makes feeder 10 or 10' safe for use by animals, with no parts for animals to become entangled in or injured by.

The design and height of the feeders 10 or 10' make them useful for all types of livestock, particularly grazing livestock since the downward motion of the head of the animal during use of the feeder 10 or 10' closely resembles the natural grazing position of the head while grazing. The livestock feeders 10 or 10' disclosed herein are suitable for use by any livestock species of any age or size, including but not limited to cattle, sheep, goats, horses, mules, donkeys, bison, alpacas, llamas, deer, elk, exotic animals, zoo animals, game animals, and wildlife animals.

The feeders 10 or 10', and particularly the inner receptacle 24 of the pan 20, are suitable for providing any type of feedstuff to an animal, including but not limited to granular feedstuffs, loose feedstuffs, ground feedstuffs, pelleted feedstuffs, cubed feedstuffs, liquid feedstuffs, paste feedstuffs or feedstuffs in compressed block form. Furthermore, feeders 10 or 10' as disclosed herein are suitable for providing to livestock animals any kind of nutritional component or nutritional supplement, including but not limited to supplements, mineral supplements, vitamin supplements, protein supplements, energy supplements, medicated supplements, growth-promoting compounds, estrous synchronization compounds, pro-biotic compounds, pre-biotic compounds, salts, or combinations thereof. These types of feedstuffs are often provided in a container, bag, sack, bucket, or in bulk, each of which can be dumped, poured, or placed in the inner receptacle 24 of the pan 20 of the feeder 10 or 10' by a user. See, e.g., FIGS. 5B and 6B illustrating feeders 10 in use by a cow 100 with a feedstuff 200 in the feeder 10.

Figure 9:
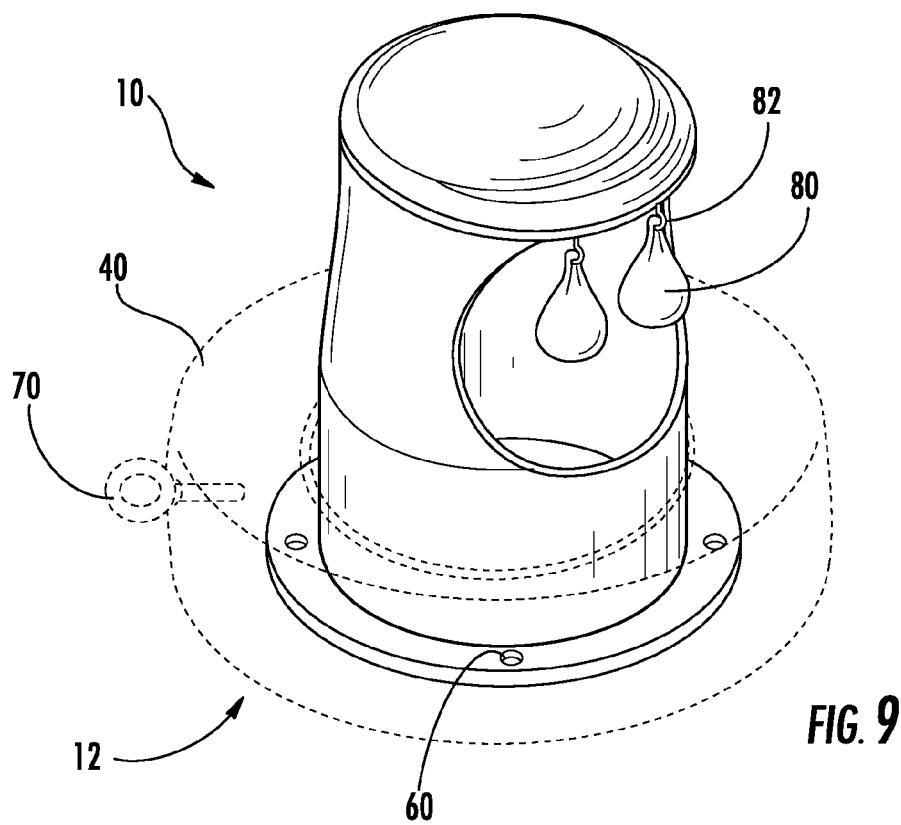
FIG. 9 is a perspective view of a livestock feeder in accordance with the subject matter herein.
Figure 10:
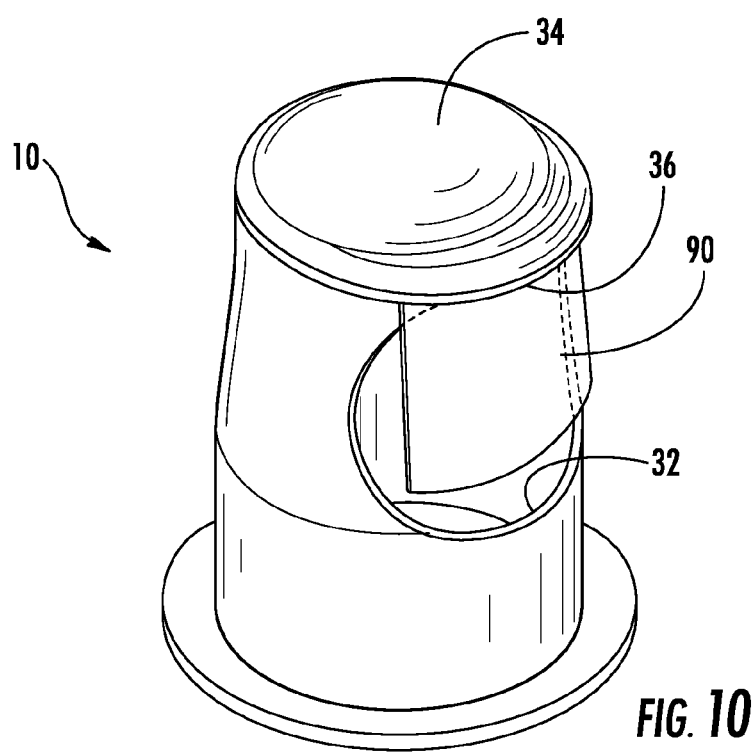
FIG. 10 is a perspective view of a livestock feeder in accordance with the subject matter herein.

Referring to FIGS. 8-10, a livestock feeder 10 or 10' as disclosed herein can further comprise addition aspects such as stakes 62 for securing the feeder to the ground. While the feeder 10 or 10' can be suitably stable without the use of stakes 62, particularly if used with a base 12, the use of stakes 62 can be optionally used in certain instances to secure feeder 10 or 10' to the ground. See FIG. 8. A feeder 10 or 10' can optionally have holes 60 in flange 22 through which stakes 62 can pass to secure the feeder 10 or 10' to the ground. See FIG. 9.

Referring to FIG. 9, feeder 10 or 10' can further comprise an eye-bolt, hook 70, or the like, secured to the base 12, such as a tire 40, which can be used for attaching a rope or chain for purposes of moving feeder 10 or 10', as discussed hereinabove. The eye-bolt or hook 70 can be attached to base 12 using a bolt, screw or other fastening device as would be appreciated by one of ordinary skill in the art.

As illustrated in FIG. 9, feeder 10 or 10' can further comprise one or more insecticide applicators 80. Insecticide applicators 80, such as "dust bags" or "fly bullets", can be used to apply insecticides or insect repellants to an animal while the animal is using the feeder 10 or 10'. One or more insecticide applicators 80 can be positioned at or near the opening 32 of the feeder 10 or 10' so that the animal will come into contact with the insecticide applicators 80 upon accessing the feeder 10 or 10' through the opening 32. When the animal brushes up against the insecticide applicators 80 the insecticide, usually in a powder or liquid form, will rub off on the animal. For example, one or more insecticide applicators can be secured near the top of opening 32, or on the bottom side of overhang 36, as illustrated in FIG. 9. The insecticide applicators 80 can be secured to feeder 10 or 10' using a fastening device 82, such as a hook, bolt, screw, snap, rivet or other fastening device.

As illustrated in FIG. 10, feeder 10 or 10' can further comprise a flap 90 substantially covering opening 32. Flap 90 can prevent, reduce or minimize precipitation from entering opening 32 to thereby keep feedstuffs in pan 20 dry. Flap 90 can be affixed or attached to hood 34, overhang 36, and/or opening 32, using bolts, screws, grommets, snaps or the like. Flap 90 can be removable and/or replaceable. Flap 90 can comprise a single sheet of material or multiple strips of material. By way of example and not limitation, flap 90 can be made of a plastic material, rubber material, cloth material, or the like. Flap 90 can be constructed of a UV-resistant material. Flap 90 can be a clear, opaque or tinted material. Flap 90 can be designed to allow livestock ready access to the feedstuffs in feeder 10 or 10' while protecting the feedstuffs from environmental elements.

The present subject matter can be embodied in other forms without departure from the spirit and essential characteristics thereof. The embodiments described therefore are to be considered in all respects as illustrative and not restrictive. Although the present subject matter has been described in terms of certain preferred embodiments, other embodiments that are apparent to those of ordinary skill in the art are also within the scope of the present subject matter.

What is claimed is:

1. A livestock feeder comprising:
   (a) a cylindrical shaped pan having a bottom and sides forming a generally cylindrical outer periphery and recessed inner receptacle for holding feed;
   (b) a cylindrical shaped hood comprising a substantially cylindrical member affixed to and extending vertically from the pan;
   (c) an opening in the hood of a size sufficient to permit livestock to have access therethrough to the inner receptacle of the pan; and
   (d) a disc-shaped flange extending perpendicular from the cylindrical outer periphery of the sides of the pan and near the bottom of the pan, wherein a diameter of the disc-shaped flange is greater than the diameter of the cylindrical outer periphery of the pan, wherein the disc-shaped flange that extends from the cylindrical outer periphery of the sides of the pan provides a surface against which a base structure that can slidingly engage the outer periphery of the pan can abut, wherein the disc-shaped flange, by providing a surface against which a base structure can abut, can provide for the stabilization of the feeder, the disc-shaped flange is configured to rest on a ground surface when the feeder is in use as a livestock feeder, wherein the entire feeder is a single molded piece, wherein the bottom of the pan and disc-shaped flange together form a lower surface of the feeder, wherein the lower surface of the feeder forms a continuous planar surface configured to rest on a ground surface when the feeder is in use as a livestock feeder.

2. The livestock feeder of claim 1, wherein the hood and pan are constructed as molded composites comprising a polyethylene material.

3. The livestock feeder of claim 1, wherein the hood comprises a domed lid, wherein the lid comprises an overhang extending horizontally from the hood and above the opening of the hood, wherein the hood substantially covers and shields the inner receptacle of the pan.

4. The livestock feeder of claim 1, wherein the feeder is portable.

5. The livestock feeder of claim 4, wherein the feeder can be towed or dragged by a person or vehicle.

6. The livestock feeder of claim 2, wherein the polyethylene material is UV resistant.

7. The livestock feeder of claim 2, wherein the polyethylene material resists corrosion.

8. The livestock feeder of claim 1, wherein the feeder is about 25 inches to about 50 inches tall, is about 20 inches to about 30 inches in diameter, and has an opening in the hood of about 15 inches to about 20 inches in diameter.

9. The livestock feeder of claim 8, wherein the pan is about 10 inches to about 20 inches tall, and the hood is about 15 inches to about 30 inches tall.

10. The livestock feeder of claim 1, wherein the entire feeder, including the pan, hood, opening and flange, is a single molded piece, wherein the single molded piece is constructed from a polyethylene material.

* * * * *